United States Patent [19]
Gray

[11] 3,810,176
[45] May 7, 1974

[54] ROLL AND PITCH CORRECTION FOR A FIXED-ANTENNA DOPPLER SYSTEM

[75] Inventor: John Gray, Guilford, Conn.

[73] Assignee: The Singer Company, Little Falls, N.J.

[22] Filed: Dec. 18, 1972

[21] Appl. No.: 316,104

[52] U.S. Cl. .......................... 343/8, 343/9
[51] Int. Cl. ............................... G01s 9/48
[58] Field of Search ...................... 343/8, 9

[56] References Cited
UNITED STATES PATENTS
3,719,923   3/1973   Waterman .................... 343/9 X Primary Examiner—T. H. Tubbesing
Attorney, Agent, or Firm—T. W. Kennedy

[57] ABSTRACT

Apparatus to correct the signals obtained from a fixed antenna doppler navigation system, which will be in terms of body axes velocities, to take into account the pitch and roll of the aircraft in which the system is installed to thereby provide corrected signals representing ground velocity components is shown. The equations expressing the transformation from body axis velocities to ground velocities are solved using a plurality of clipper-multiplier bucket counter units to perform the required multiplications of the aircraft body axes components, expressed as frequencies, by functions of pitch and roll expressed as DC voltages to obtain the terms in the equations. The DC voltages proportional to functions of pitch and roll are obtained by demodulating 400 HZ sine and cosine signals available in the aircraft. Also shown is a multiplying demodulator and sampling multiplying dividing apparatus used in simplifying the computations of the pitch and roll functions used in the equations.

22 Claims, 11 Drawing Figures

CLIPPER-MULTIPLIER AND BUCKET COUNTER UNIT WITH D.C. REF INPUT

CLIPPER-MULTIPLIER AND BUCKET COUNTER UNIT

FIG. 4

CLIPPER-MULTIPLIER AND BUCKET COUNTER FOR MULTIPLYING A TRIGONOMETRIC FUNTION

ROLL AND PITCH CORRECTION FOR A FIXED-ANTENNA DOPPLER SYSTEM

BACKGROUND OF THE INVENTION

This invention relates to doppler navigation systems in general and more particularly to an improved system for providing pitch and roll corrections to the output signals of a fixed antenna type doppler system.

In a doppler navigation system of the type where the antenna is fixed to the aircraft, as the aircraft pitches or rolls, an error is introduced into the system outputs since the doppler system outputs will represent the velocity vector of the aircraft in terms of the aircraft body axes. To provide an accurate indication of speed along the ground, these signals must be corrected for the pitch and roll of the aircraft. That is to say a coordinate transformation from aircraft body to ground axes must be done. Various systems have been developed to perform this transformation. However, in almost all cases, they use servo mechanisms to provide the required multiplications needed. For example, see U.S. Pat. No. 3,095,562 granted to L. H. Dworetzky et al. and assigned to the same assignee as the present invention and U.S. Pat. No. 3,228,027 granted to R. M. Milnes.

SUMMARY OF THE INVENTION

The present invention provides the required transformations to the doppler output signals without the use of servos. The outputs of the doppler system, which are frequencies proportional to the body axes velocities, are multiplied by the required roll and pitch terms using clipper multipliers and bucket counters to obtain D.C. voltages. The roll and pitch terms used in the multiplications are available from a gyro in the aircraft as 400 Hertz signals. These signals are demodulated in a unique way which combines demodulation and multiplications to obtain the needed terms. Upon the completion of all computations the resulting ground velocities are reconverted to frequency signals for further use in navigation systems.

DETAILED DESCRIPTION OF THE PREFERRED EMBODIMENT

A doppler navigation system with a fixed antenna provides three outputs $f_x$, $f_y$, and $f_z$ which are proportional respectively to the velocity along the X,Y, AND Z axes of the aircraft, i.e., $V_x$, $V_y$ and $V_z$. To provide the ground speed components $V_H$, the velocity in the direction of heading and $V_D$, the drift velocity, it is necessary to transform these outputs to take into account the roll and pitch of the aircraft. The exact equations expressing the relationship between these components are as follows:

$V_H = V_x \cos P + V_y \sin R \sin P - V_z \cos R \sin P$
$V_D = V_y \cos R + V_z \sin R$, where $P$ is the aircraft pitch and $R$ is the aircraft roll.

These equations may be written in a form with the primary terms $V$ and $V$ plus correction terms. These equations would be as follows:

$V_H = V_x - V_z \cos R \sin P - V_x (\sin^2 P/1 + \cos P) + V_y \sin R \sin P$
$V_D = V_y + V_z \sin R - V_y(\sin^2 R/1 + \cos R)$  (2)

Although these equations can be solved by the apparatus of the present invention in this form, they can be simplified for this particular application to reduce the hardware required in implementing them. The simplified form of the equations is as follows:

$V_H = V_x - V_z \cos R \sin P - V_x (\sin^2 P/2 \cos P)$
$V_D = V_y + V_z \sin R - V_y (\sin^2 R/2 \cos R)$  (3)

These equations may also be written as:

$V_H = V_x - V_z \cos R \sin P - \frac{1}{2} V_x \sin P \tan P + V_y \tan P \sin R$
$V_D = V_y + V_z \sin R - \frac{1}{2} V_y \sin R \tan R$  (4)

which is the form in which they will be solved by the apparatus of the present invention.

Figure 1:
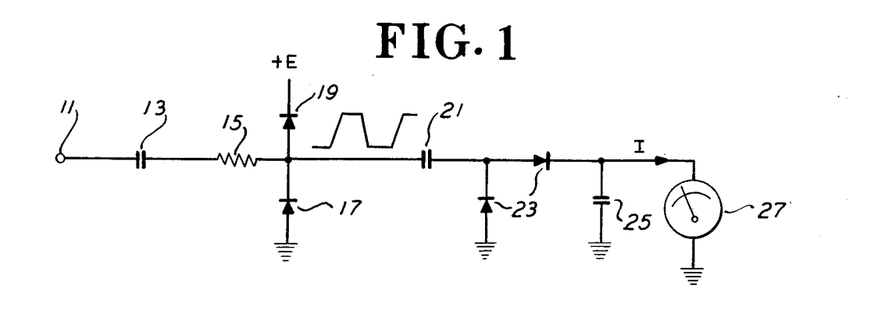
FIG. 1 is a schematic diagram of the basic clipper-multiplier bucket counter used in the present invention.

Since a great number of the computations are done in the apparatus through the use of clipper-multipliers and bucket counters, the basic operation of these devices will first be described. FIG. 1 shows the basic schematic of the clipper-multiplier bucket counter. In this circuit a frequency input $f_x$, $f_y$, or $f_z$ will be multiplied by the required pitch or roll term, which will have first been converted to a D.C. voltage, to obtain a current output which is proportional to the product of the two terms. The frequency is provided as an input at terminal 11 and goes through a capacitor 13 and resistor 15 to the junction of two clipping diodes 17 and 19. Diode 17 is connected to ground and diode 19 to a positive voltage + E, which, as will be described below, will represent one of the terms in the equation. The clipped waveform will cause capacitor 21 to fully charge and discharge once each cycle. The resulting current which may be made either positive or negative by orientation of two pumping diodes 23 will be equal to $I = qf = CEf$. The current is averaged by capacitor 25 to obtain a D.C. value. A meter 27 is shown as an example of a device to read out the final current. Since the C in the equation above is a constant, it is easy to see that the output current will be proportional to the input voltage, E, times the frequency input, $f$. Thus, in this manner, a voltage representing, for example, sine R in the equation above, can multiply a frequency $f_x$ proportional to $V_x$ in the same equation to provide a current representing their product. In the remainder of the description wherever clipper-multiplier bucket counters are included, common reference numerals will be used and it will be understood that operation will be as described above.

Figure 2:
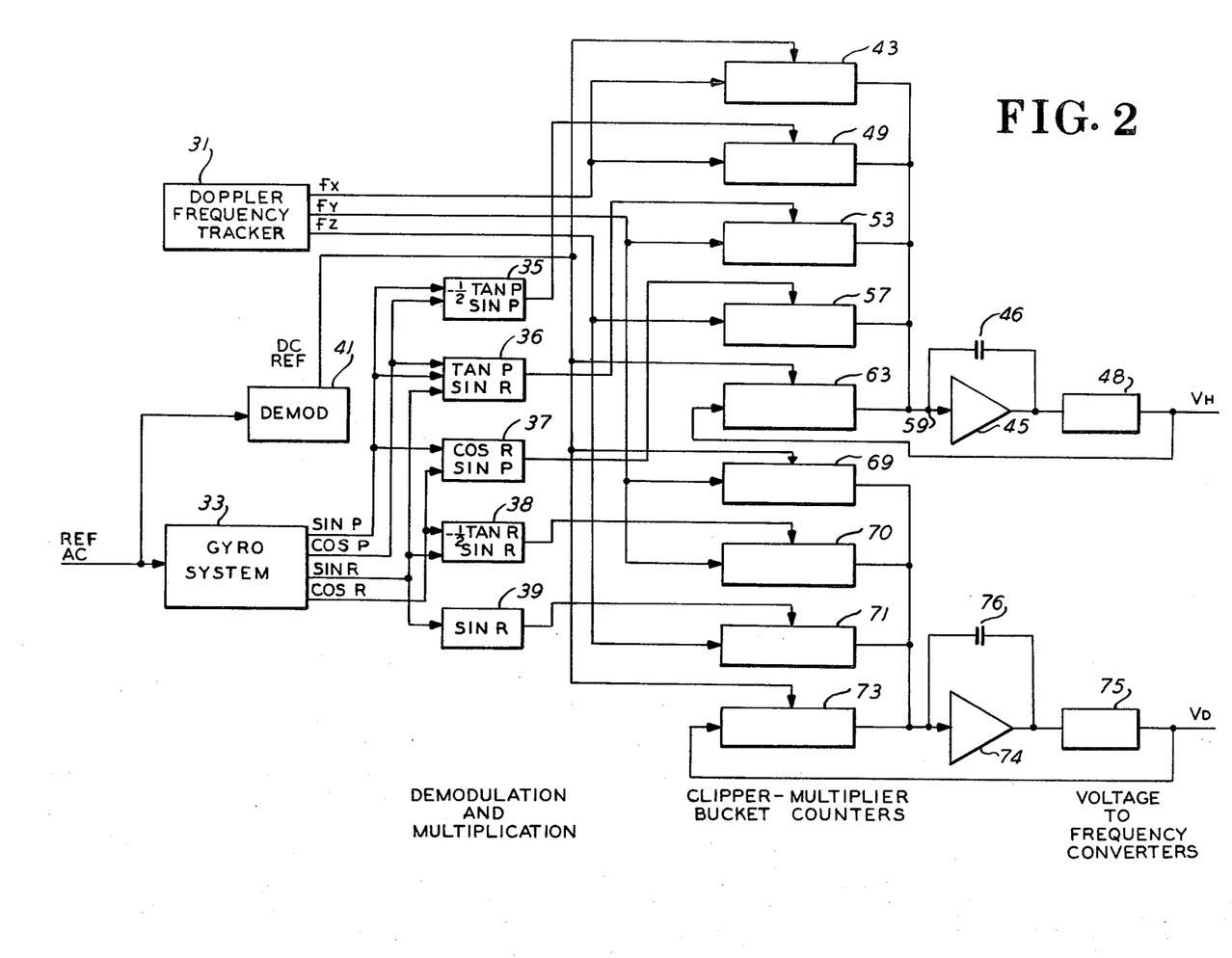
FIG. 2 is an overall block diagram of the preferred embodiment of the present invention.

FIG. 2 is an overall system diagram showing implementation of the equations. A doppler frequency tracker 31 provides the outputs $f_x$, $f_y$, and $f_z$, frequencies representing the velocity components along the three aircraft body axes. A gyro system 33 provides resolver outputs since P, cosine P, sine R and cosine R (where R represents roll and P, pitch). The operation of the portions of the system providing the frequency and resolver outputs is explained in U.S. Pat. No. 3,095,562 referenced above and no further details will be given herein. The sine P and cosine P, sine R and cosine R signals provided by the resolvers will be modulated 400 Hertz A.C. signals. A series of multiplication and demodulator blocks 35, 36, 37, 38 and 39 are used to convert these to D.C. levels and at the same time perform required multiplications. These blocks will be described in detail below. An additional detector or demodulator 41 is used to demodulate the A.C. reference voltage to obtain a constant D.C. voltage which is used to multiply certain of the terms.

The resolvers are all referenced to this AC voltage. Thus, for example, if the RMS value of the reference were 10 volts, the resolver would provide an output of 5 volts for sin P where P is 30°, 8.66 volts for P 60° etc. By maintaining proper scaling throughout the system when demodulating the A.C. voltages to obtain D.C. voltages, this relationship between the reference voltage and the sines and cosines will be maintained. Thus, as compared to demodulated sine and cosine voltages, the DC reference will have a relative weight of one.

The $f_x$ output is provided to a clipper-multiplier and bucket counter unit 43 where it is multiplied by the constant D.C. voltage. This will result in a current output representing $V_x$ which is provided to the summing junction of an amplifier 45. The $f_x$ output is also multiplied by ($-$ tan P sin P/2) in clipper-multiplier 49. The quantity $f_y$ is multiplied by tangent P sine R in clipper-multiplier 53 and that term then also provided to amplifier 45. The final term of the equation is obtained by multiplying $f_z$ by -cosine R sine P in clipper-multiplier and bucket counter unit 57. The output values of units 43, 49, 53 and 57 are all summed at point 59 of amplifier 45 to provide an output which is proportional to $V_H$ the velocity along the aircraft heading. However, since $V_H$ must be expressed as a frequency for subsequent use, just as $f_x$, $f_y$ and $f_z$ are so expressed, the output of amplifier 45 having a capacitor 46 in its feed back path is first passed through a voltage to frequency converter 48. To close the loop of the system, the frequency output of converter 48 is provided back to another clipper-multiplier and bucket counter unit 63, which has as its voltage input the D.C. reference value, whose output is fed to the summing junction 59 of amplifier 45.

In a simlar manner, the terms of the $V_D$ equations are computed in clipper-multipliers and bucket counter units 69 through 73 to obtain drift velocity. The $V_y$ term is computed in clipper-multiplier and bucket counter unit 69, the $-V_y$ ½ tangent R sine R term in clipper-multiplier and bucket counter unit 70 and the $V_z$ sine R term in clipper-multiplier and bucket counter unit 71. As before, these are, after being summed, converted by frequency converter 75 whose output is used as a feedback signal to clipper-multiplier and bucket counter 73 unit to close the loop around the amplifier 74. In similar fashion to amplifier 45, amplifier 74 has a feedback capacitor 76.

Figure 3:
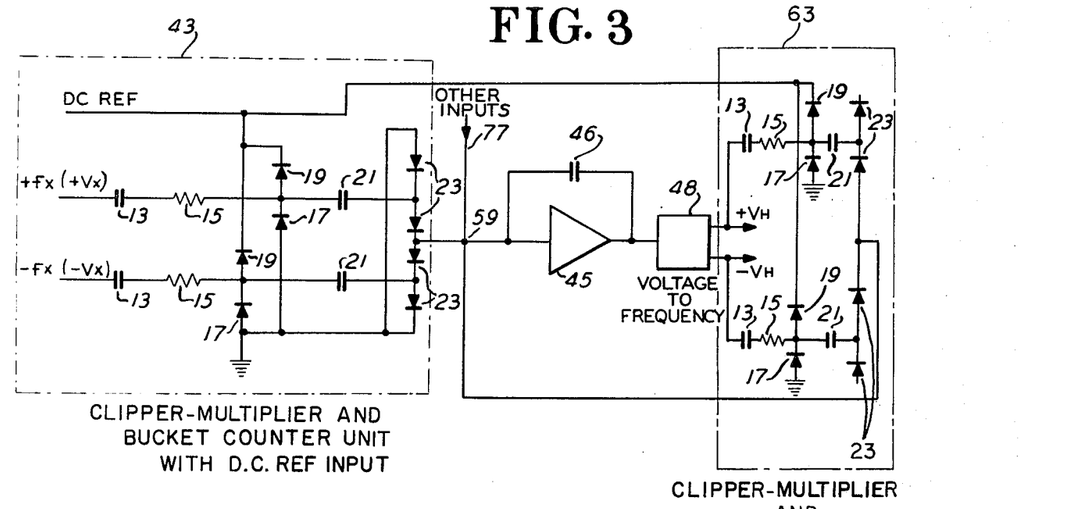
FIG. 3 is a schematic diagram of a portion of FIG. 2 showing the clipper-multiplier bucket counter arrangement used in computing certain terms of the equations solved by the apparatus of FIG. 2.
Figure 4:
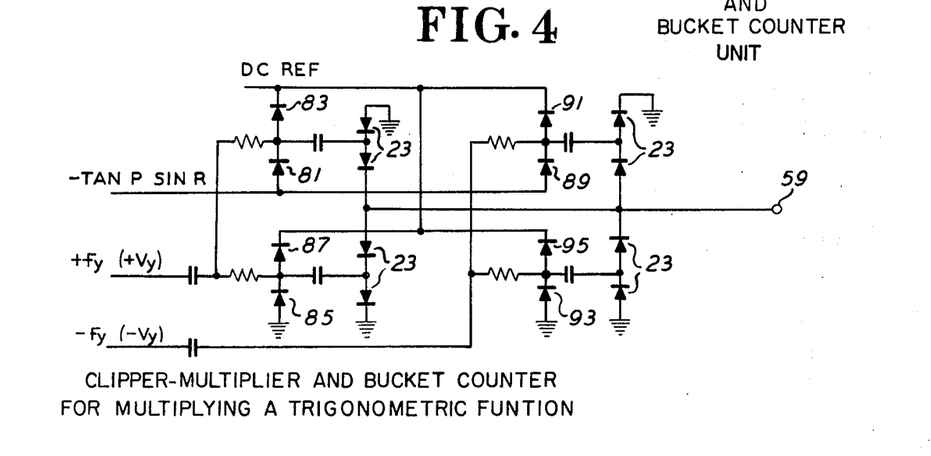
FIG. 4 is a schematic diagram of a second clipper-multiplier bucket counter used in computing others term of the equations solved by the apparatus of FIG. 2.

Each of the clipper-multiplier bucket counter units of FIG. 2 will contain two or more of the circuits described in connection with FIG. 1 above. This is necessitated by the fact that in actuality, the $f_x$ output of the doppler system is two outputs only one of which will be present at any given time. One output represents a positive velocity and another output represents a negative velocity. FIGS. 3 and 4 show how this is handled in the present system. FIG. 3 shows a portion of FIG. 2 including amplifier 45 and clipper-multiplier and bucket counter unit 43. The inputs from the other clipper-multiplier and bucket counter units are shown as coming into the summing junction 59 on a line 77. In the case of the $+f_x$, input, pumping diodes 23 are arranged to permit a positive flow of current into summing point 59. In the case of negative $f_x$, the pumping diodes are arranged to provide a negative current to the summing point. In a manner similar in operation to that of the doppler system, the voltage to the frequency converter 48 provides separate outputs for positive $V_H$ and negative $V_H$. The pumping diodes 23 of the positive $V_H$ output are arranged to provide a negative current to be summed with the positive current resulting from a positive $f_x$ at summing point 59 to balance it out. Similarly, the negative $V_H$ output provides a positive current to offset the negative current resulting from the negative $f_x$ input.

FIG. 4 illustrates typical circuit operation with the positive and negative frequency inputs when a multiplication by one of the trigonometric functions takes place. A multiplication in the $V_H$ equation of $V_y$ by tangent P sine R is shown as an example. For the computation where $V_y$ is positive, tangent P sine R is provided as a reference to clipping diode 81 while clipping diode 83 has the D.C. reference as its reference. Pumping diodes 23 associated with the $f_y$ input to this portion of the circuit are arranged to cause the current to flow towards summing point 59. A second set of clipping diodes 85 and 87, also having $+f_y$ as an input, are referenced respectively to ground and the D.C. reference voltage. The pumping diodes 23 associated therewith are arranged to draw current from summing point 59. The resulting current will thus be the difference between the two currents and will be equal to $+ V_y$ tangent P sine R, the desired value. That is, the current from the pumping diodes 23 associated with the clipping diodes 81 and 83 will be $f_y$ ($E_{DC\ Ref} - E_{-tan\ P\ sin\ R}$) and that from the pumping diodes 23 associated with the clipping diodes 85 and 87 will be $f_y\ E_{DC\ Ref}$. When added the result is $f_y E_{DC\ Ref} - f_y$ E tan P sin R $- f_y E_{DC\ Ref}$ or $- f_y$ E tan P sin R When this value is passed through amplifier 45 of FIGS. 2 and 3 it will be inverted to give $+ f_y\ E_{-tan\ P\ sin\ R}$ which will be proportional to $+V_y$ ($-$tan P sin R). In a similar manner, the $-V_y$ input has, in the first part of its current, clipping diode 89 referenced to the minus tangent P sine R voltage and diode 91 referenced to the D.C. reference. Its associated pumping diodes 23, however, are arranged to cause current flow in a negative direction indicating the negative nature of the $f_y$ term. Offsetting the current provided by this set of diodes are diodes 93, referenced to ground, and 95, referenced to the D.C. reference, and therir associated pumping diodes 23 which cause a positive flow of current toward summing point 59 to offset the negative current. Again, the difference between the two currents will be the input to summing point 59 and will equal $-V_y$ ($-\tan R \sin R$).

Figure 5:
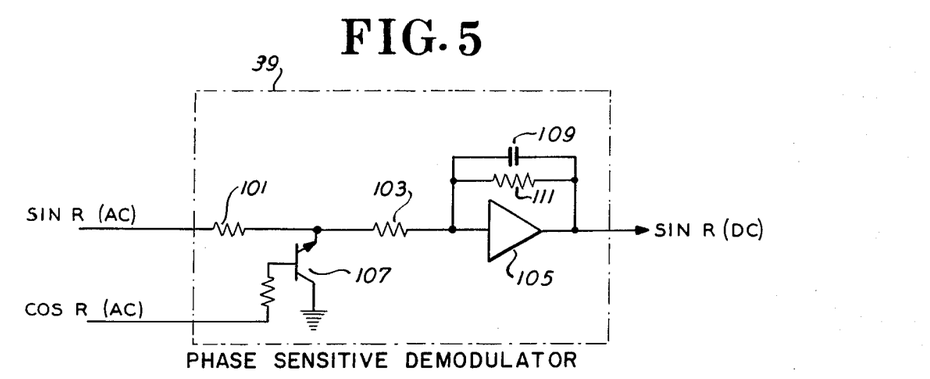
FIG. 5 is a schematic diagram of a basic phase sensitive demodulator used in the apparatus of FIG. 2.

FIG. 5 illustrates the phase sensitive detector or phase sensitive demodulator 39 of FIG. 2 which may be used to convert the 400 Hertz since R signal to a D.C. level. (This general scheme used here will be used throughout where demodulation is required). The input is provided through resistors 101 and 103 to an operational amplifier 105. A transistor 107 has its emitter connected to the junction of resistors 101 and 103 and its collector connected to ground. Its base is controlled through a resistor by the consine R signal. Cosine R is used as a control signal in this case, since, because the aircraft will very seldom roll to a large degree, it will always be positive and always be in phase wih the reference used to generate all the resolver signals. This will result in transistor 107 grounding the input to amplifier 105 for every positive cycle causing only the negative cycles of sin R to reach the amplifier (Assuming sine R is in phase with the reference). If sine R is out of phase with the reference, the positive cycles will be input to amplifier 105. When the cycles of the sine wave of sine R are passed through amplifier 105, they will be inverted and because of the capacitor 109 and resistor 111 in the feedback loop will be filtered to provide a D.C. level. (Positive when sine R is in phase and negative when 180 out of phase). Use of cosine R rather than the A.C. reference as a control signal also provides compensation for any phase shift which may have occurred through the resolver. Thus, cosine R will normally be exactly in phase or 180° out of phase with the sine R signal.

The demodulator 41 of FIG. 2 which provides the DC reference will be identical to that shown on FIG. 5 except that it will have the AC reference voltage as inputs.

Figures 6, 6A:
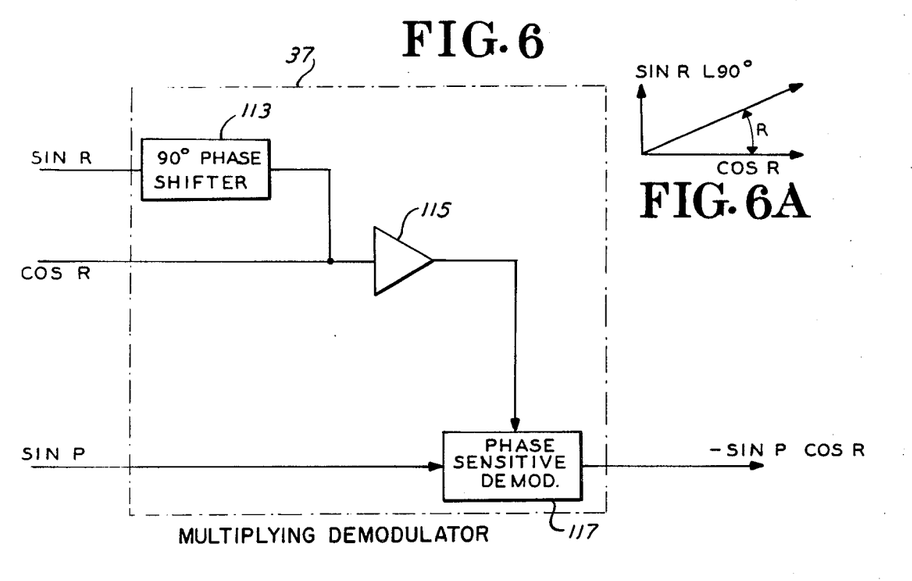
FIG. 6 is a block diagram illustrating a multiplying demodulator used in the apparatus of FIG. 2.
FIG. 6A is a vector diagram helpful in understanding the operation of the multiplying demodulator of FIG. 6.
Figure 7:
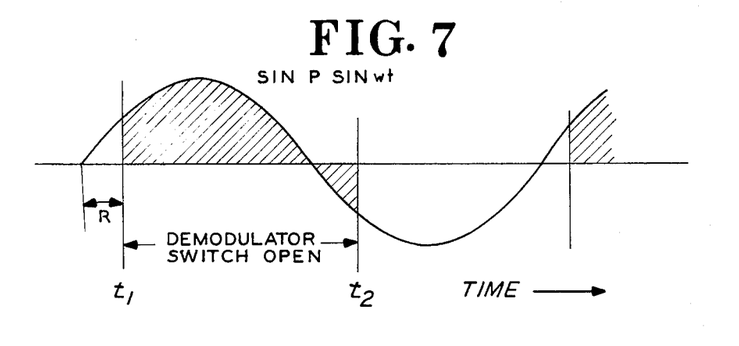
FIG. 7 is a waveform diagram helpful in understanding the operation of the multiplying demodulator of FIG. 6.

Block 37 of FIG. 2 from which the cosine R sine P term is obtained is illustrated by FIG. 6. Sine R is passed through a phase shifter 113 where its phase is shifted 90°. It is then summed with cosine R in a summing device 115 which may be for example, a summing amplifier. The result is a signal which is equivalent to co R as shown by FIG. 6A. The resulting signal is used as a switching signal for a phase sensitive demodulator 117, similar to that shown in FIG. 5, which has as its signal input sine P. The output from this demodulator will be minus sine P cosine R. The output will be minus since it will be inverted by the amplifier in the phase detector. The shaded portion of the wave of FIg. 7 illustrates the portion of the sine P wave which will be switched on in demodulator 117. The period between time $t_1$ and time $t_2$ is the time that the switch is open and the input provided to an amplifier similar to amplifier 105 of FIG. 5. The shaded portion under the curve is the voltage which will be provided and to and averaged by the amplifier. Consider the case where roll is zero and thus, since sin 0 equals zero, sin R would also be zero. In that case, there would be no input from phase shifter 113 and cosine R would be the only input to the demodulator 117. There would be no offset and the full positive cycle of FIG. 7 would be provided as an input and averaged to obtain the D.C. output which would be equal to -sine P (after inversion in the amplifier of demodulator 117). This is a correct answer since in this case, with roll zero, the cosine of roll is 1 and cosine R sine P should be equal to sine P. Consider the other extreme where roll is 90°. In that case, cosine R would be zero and sine R would be 1. Sine R which is shifted 90° will be the only input to amplifier 115 the output of which will cause half of the positive cycle and half of the negative cycle of the sine P wave to be provided as an input to the amplifier of demodulator 117. When this input is averaged, the result will be zero volts D.C., the proper answer in this case, since cosine R is now zero. This device will be referred to throughout the balance of this specification as a "multiplying demodulator."

Figure 8:
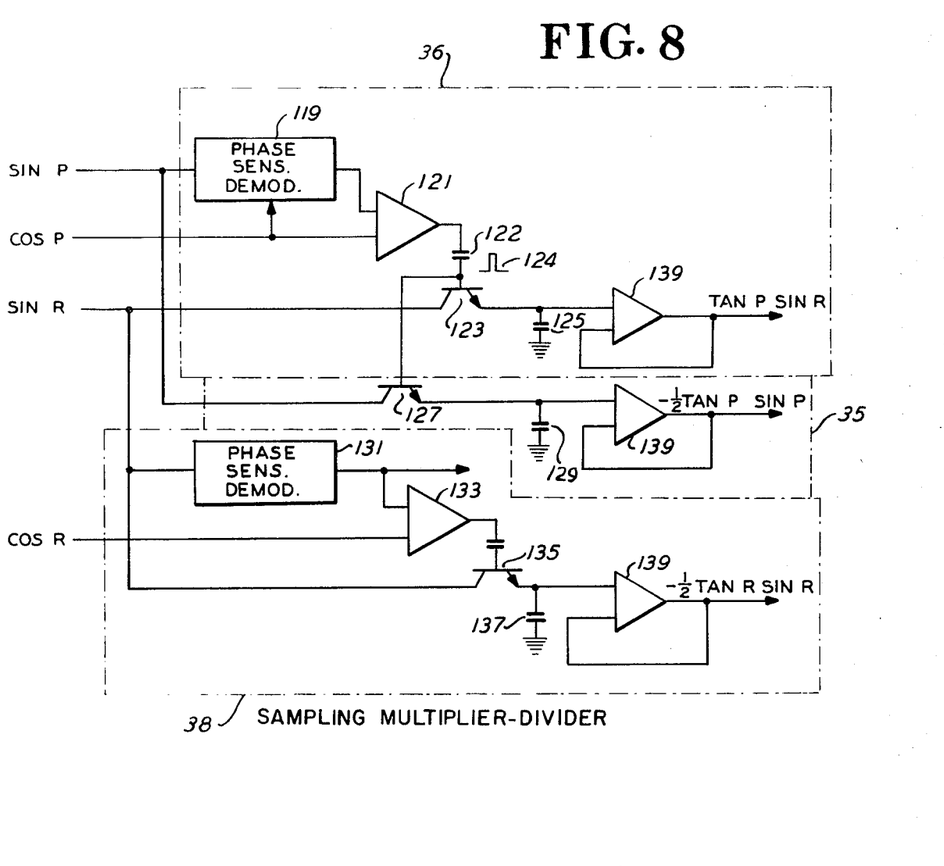
FIG. 8 is a block-schematic diagram showing a number of sampling multiplier dividers used in the apparatus of FIG. 2 for solving a simplified form of equations.
Figure 8A:
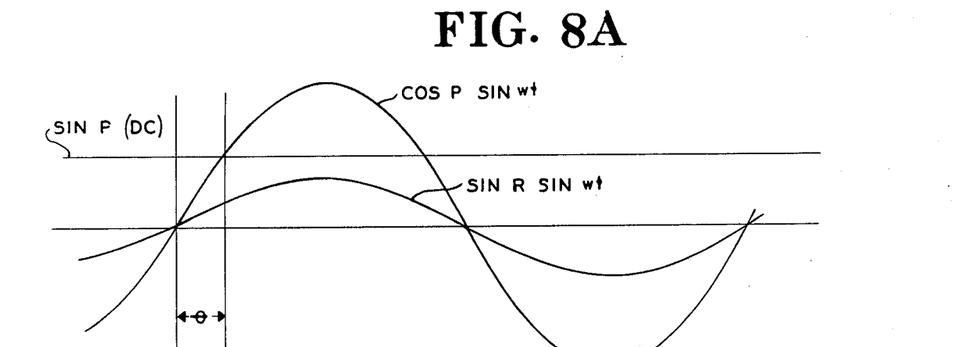
FIG. 8A is a waveform diagram helpful in understanding the operation of the circuits of FIG. 8.

The computation scheme for the remaining functions of R and P provided by blocks 35, 36 and 38 of FIG. 2 is shown on FIG. 8. A function equivalent to tangent P is computed by summing the D.C. value of sine P (demodulated by demodulator 119) with cosine P in an amplifier 121. A short pulse is generated through capacitor 122 at the output of amplifier 121 every time the A.C. value of cosine P rises to equality with the D.C. value of sine P. (i.e., amplifier 121 because of its high gain is used here as a comparator providing a large output change when one input exceeds the other. Capacitor 122 differentiates the rising edge of the amplifier output to provide a pulse 124 as shown). This occurs at the time $\omega t = \theta$ which may be positive or negative. As shown on FIG. 8A the instantaneous value of the cos P voltage is cos P sin $\omega t$. Thus, at this point, where $\omega t = \theta$, cosine P sine $\theta$ equals sine P. Pulse 124 is used to close transistor 123 which has sine R as an input and will leave a voltage level on capacitor 125, which is connected to the output of transistor 123, equal to the value of the sine R wave at this instant. This voltage, therefore, is:

$$e_1 = \text{Sin R Sin } \theta$$
$$= (\text{Sin R Sin P/cos P}) = \text{Sin R Tan P} \qquad (5)$$

since Cos P Sin $\theta$ = sin P or sine $\theta$ = (sin P/cos P.)
In a similar manner, transistor 127, which has sin P as an input, and capacitor 129 are used to obtain the value minus one-half tangent P sine P. The computation of tan R sin R is also done in like manner. A D.C. value of sine R from a phase detector 131 is summed with cosine R in amplifier 133 to develop a pulse to switch on transistor 135 which has sine R as its input. This causes capacitor 137 to store a voltage equal to minus tangent R sine R.

To prevent current drain, each of the capacitors is provided as an input to an operational amplifier 139 (normally a unity gain amplifier except where scaling is needed) and the output for the use in the clippers and bucket counters taken therefrom. Because all of the voltages involved here are derived from the resolvers and since all three are developed by means of ratios, any errors introduced because of variation in resolver excitation voltage will be cancelled out by the present system.

The proper sign of each term may be obtained by using inverting or non-inverting inputs of amplifiers 121 and 133 in a well known manner. (Amplifier 139 should have its input signal fed to its positive input terminal to avoid drain). The one-half in the tan P sin P term may be obtained by scaling its amplifier 139. Scaling may also be accomplished in amplifiers 45 and 74 of FIG. 2.

This circuit will be described hereafter as a "sampling multiplier-divier." In general terms, it performs the computation of the following equation:

$$e_1 = (ZY/X) \qquad (6)$$

where X, Y and Z are each represented by a modulated A.C. voltage which is in phase or 180° out of phase with a reference. The instantaneous value of the respective X, Y and Z voltages will be X sin ωt, Y sin ωt and Z sin ωt. Thus, it is possible to demoudlate Y and then sample Z sin ωt when X sin ωt reaches equality with the Y D.C. voltage to obtain $e_1$. If the angle at which equality occurs is ωt = θ, then at this point:

$$X \sin \theta = Y \text{ and}$$
$$e_1 = Z \sin \theta \qquad (7)$$

substituting for sin θ results in $$e_1 = (ZY/X) \qquad (8)$$

It is also possible to solve the exact equations (2) given above with similar devices. In that case the overall system will be identical to that of FIG. 2 except that blocks 35–39 described above will now be as shown in FIG. 9. Portions of FIG. 9 identical to circuits already described are given identical reference numerals and will not be re-described in this section of the specification. For example, computation of Cos R Sin P is as shown on FIG. 6 and sin R is computed by demodulator 131 as described in connection with FIG. 5.

Figure 9:
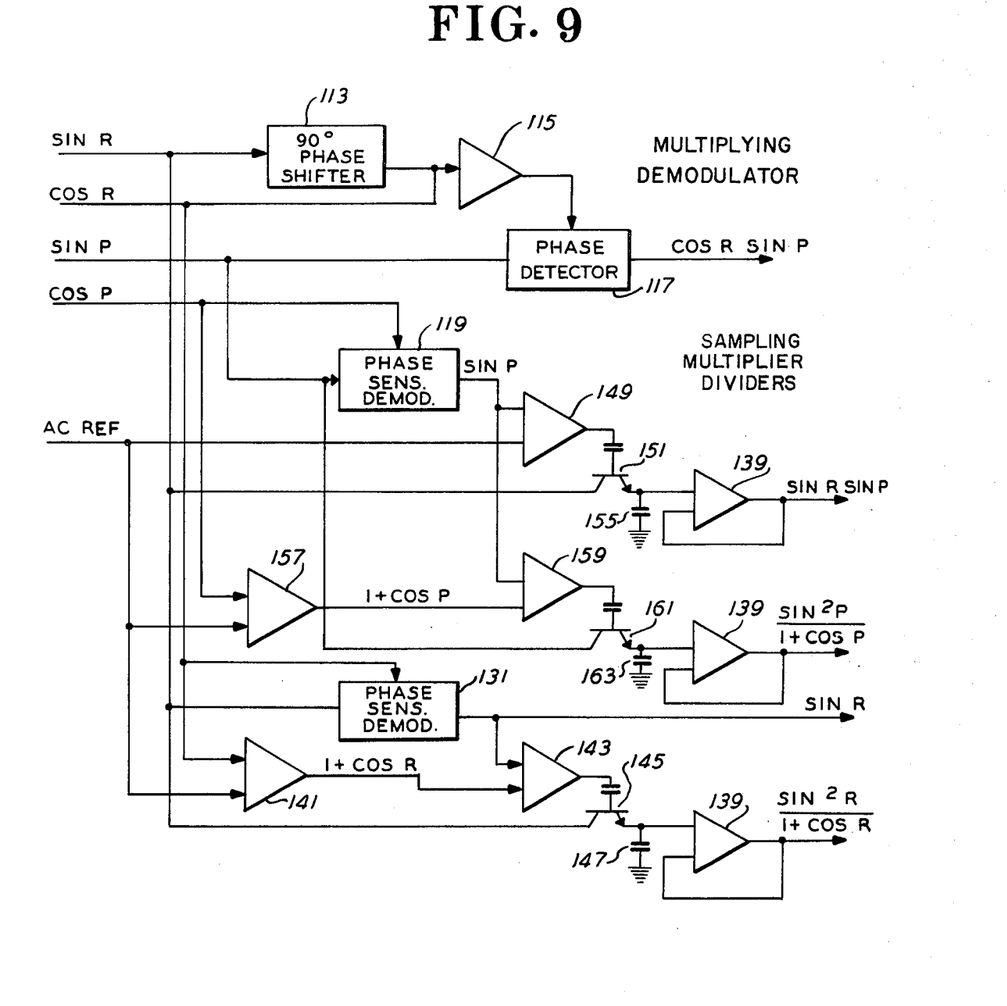
FIG. 9 is a block-schematic diagram of the multiplying demodulator and sampling multiplier dividers used for solving exact equations with the apparatus of FIG. 2.

The remaining terms are computed by sampling multiplier-dividers of the type described above. For example, in computing (sin²R/1 +cos R), cosine R is summed with the reference A.C. in a summing device 141 (which may be an operational amplifier) to obtain 1 + Cos R and its output is then summed with the D.C. value of sine R in amplifier 143 to develop a turn on pulse to samle sine R at the proper point via transistor 145 and to store it in capacitor 147. Here in terms of the general equation above Y = sin R, X= 1 + cos R and Z = sin R. Thus (ZY/X) = (sin R sin R/1 +cos R) = (sin²R/1+cos R), the desired result. As before, a unity gain amplifier 139 is used for isolation. Similarly, to obtain the sine R sine P terms, the D.C. level of sine P is summed in amplifier 149 with the reference A.C. to develop a pulse to turn on transistor 151 to sample sine R at the proper point and store it in capacitor 155. Here Y = sin P, X = 1 and Z = sin R thus, (ZY/X) (sin R sin P/1) Again, an isolation amplifier 139 is used. The final term is found by summing the reference A.C. with cosine P in a summing device 157 to obtain a value equivalent to 1+ cosine P. This value is then summed in amplifier 159 with the D.C. value of sine P to develop an output pulse to turn on transistor 161 to sample sine P at the proper time and provide the proper voltage to be stored in capacitor 163 which is the input to another amplifier 139.

Thus, a system which will provide pitch and roll corrections to doppler outputs from a fixed antenna doppler system without the use of servos has been shown. Although a specific embodiment has been illustrated and described it will be obvious to those skilled in the art that various modifications may be made without departing from the spirit of the invention which is intended to be limited solely by the appended claims.

What is claimed is:

1. Apparatus to transform the outputs of a fixed-antenna doppler system, said outputs being frequencies proportional to the velocity along the three body axes of an aircraft in which the system is installed, into two signals representing velocities along the ground, one a velocity in the direction of heading and another the drift velocity normal thereto, there being available in the aircraft voltages representing the sines and cosines of the pitch and roll of the aircraft, the transformation being capable of being expressed by two equations each comprised of terms some of which are said body axes velocities and some of which are the product of one of said body axes velocities and a trigonometric function including at least one of said pitch and roll sines and cosines said apparatus comprising:
   a. a plurality of circuit means to provide DC voltages proportional to each required trigonometric function;
   b. means to develop a reference DC voltage whose relative value as compared to said trigonometric function voltages is one;
   c. a plurality of clipper-multipliers and bucket counter units, one being provided for each term in each of said equations, each having as one input one of the frequencies representing a body axis velocity and as another input one of said DC proportional and reference voltages and each providing an output current which is proportional to the product of its two inputs;
   d. first means to sum the outputs of the clipper-multiplier and bucket counter units having products representing the terms of the equation expressing heading velocity; and
   e. second means to sum the output of the clipper-multiplier and bucket counter units having products representing the terms of the equation expressing drift velocity.

2. The invention according to claim 1 wherein said first and second summing means comrise first and second operational amplifiers and further including for each of said first and second amplifiers:
   a. a voltage to frequency converter having as an input the amplifier output;
   b. a further clipper-multiplier and bucket counter unit having the output of said converter as one input and said DC reference voltage as another input and providing its output as a further input to be summed by said amplifier whereby closed loop operation will result.

3. The invention according to claim 2 wherein each of said frequencies provided by said doppler system is provided as a first frequency output when the velocity is in a positive direction and as a second frequency output when the velocity is in a negative direction and wherein each of said bucket counter clipper multiplier units comprises at least a pair of clipper-multiplier bucket counters, one clipper multiplier bucket counter having the frequency proportional to a positive velocity as an input and the other clipper multiplier bucket counter having the frequency proportional to a negative velocity as an input, said one clipper multiplier bucket counter being arranged to provide current in a first direction and said other clipper multiplier bucket counter being arranged to provide current in the opposite direction and wherein said voltage to frequency converter provides a first frequency output for a positive output from said amplifier and a second frequency output for a negative output from said amplifier; and said further clipper multiplier bucket counter comprises a pair of clipper multiplier bucket counters, one having said first frequency output as an input and providing a feed back current in said second direction and the other having said second frequency output as an input and providing a feedback current in said first direction.

4. The invention according to claim 3 wherein each of said clipper-multiplier bucket counter units having as another input one of said D.C. voltages proportional to said trigonemetric functions comprises:
   a. a first clipper-multiplier bucket counter having said first frequency output and said D.C. reference as inputs and providing an output current in a first direction which is proportional their product;
   b. a second clipper-multiplier bucket counter having said first frequency output, said D.C. reference voltage and one of said proportional voltages as inputs and providing an output current in an opposite direction which is proportional to the difference between said D.C. reference voltage and said one proportional voltage times said first frequency;
   c. a third clipper-multiplier bucket counter having said second frequency output and said D.C. reference as inputs and providing an output current in said opposite direction which is proportional to the product of said inputs;
   d. a fourth clipper-multiplier bucket counter having said second frequency output, said D.C.reference voltage and said one proportional voltage as inputs and providing an output current in said first direction which is proportional to the difference between said D.C. reference voltage and said one proportional voltage times said second frequency.

5. The invention according to claim 1 wherein said heading velocity is expressed as $V_H = V_X - V_Z \cos R \sin P - \frac{1}{2}V_X \sin P \tan P + V_y \tan P \sin R$ and said drift velocity as $V_D = V_Y + V_Z \sin R - \frac{1}{2} V_Y \tan R \sin R$ and said circuit means to provide DC voltages comprise:
   a. a multiplying demodulator having sin R, cos R and sin P as inputs and providing sin P cos R as an output;
   b. a first sampling multiplier-divider having sin P, cos P and sin R as inputs and providing tan P sin R as an output;
   c. a second sampling multiplier-divider having sin P, cos P and sin P as inputs and providing $-\frac{1}{2}$ tan P sin P as an output;
   d. a first phase sensitive demodulator having sin R as an input and providing a DC value proportional thereto as an output;
   e. a third sampling multiplier-divider having sin R, cos R and sin R as inputs and providing $-178$ tan R sin R as an output: said means to develop a reference DC voltage comprises:
   f. a second phase sensitive demodulator for having the reference AC voltage as an input; and said plurality of clipper multiplier units comprise:
   g. a first clipper-multiplier unit and bucket counter having the frequency proportional to $V_X$ and said reference DC voltage as inputs;
   h. a second clipper-multiplier and bucket counter unit having the frequency proportional to $V_Z$ and the output of said multiplying demodulator as inputs;
   i. a third clipper-multiplier and bucket counter unit having the frequency proportional to $V_X$ and the output of said second sampling multiplier-divider as inputs;
   j. a fourth clipper-multiplier and bucket counter unit having the frequency proportional to $V_Y$ and the output of said first sampling multiplier-divider as inputs;
   k. a fifth clipper-multiplier and bucket counter unit having the frequency proportional to $V_Y$ and said DC reference voltage as inputs;
   l. a sixth clipper-multiplier and bucket counter unit having the frequency proportional to $V_Z$ and the output of said first phase sensitive demodulator as inputs;
   m. a seventh clipper-multiplier and bucket counter unit having the frequency proportional to $V_Y$ and the output of said third ampling multiplier-divider as input;
   n. the outputs of said first, second, wherein each and fourth clipper-multipliers and bucket counter units being summed in said first summing means; and
   o. the outputs of said fifth, sixth and seventh clipper-multipliers and bucket counter units being summed in said second summing means.

6. The invention according to claim 5 wherein said first and second summing means comprise first and second operational amplifiers and further including for each of said first and second amplifiers;
   a. a voltage to frequency converter having as an input the amplifier output;
   b. a further clipper-multiplier and bucket counter unit having the output of said converter as one input and said DC reference voltage as another input and providing its output as a further input to be summed by said amplifier whereby closed loop operation will result.

7. The invention according to claim 5 wherein in said multiplying demodulator comprises:
   a. a 90° phase shifter having as an input sine R;
   b. means to sum the output of said phase shifter with cosine R;
   c. a phase sensitive demodulator having sine P as a signal input and the output of said summing means as a switching input and providing as a DC output the value of its signal input averaged over the period during which said switching input is present.

8. The invention according to claim 7 wherein said summing means comprises an operational amplifier.

9. The invention according to claim 5 where the inputs to each of said sampling multiplier-dividers may be considered respectively as X, Y, and Z, the instantaneous values of said quantities being respectively $X \sin \omega t$, $Y \sin \omega t$ and $Z \sin \omega t$, and wherein each of said sampling multiplier-divider comprises:

a. a phase sensitive demodulator having Y sin ωt as an input and providing a DC value of Y proportional to the RMS value of said input as an output; and b. means having said DC output and X sin ωt as inputs and adapted to sample and store the instantaneous value of Z sin ωt at the pont where sin ωt equals theta which occurs when the instantaneous value of X sin ωt becomes equal to the DC value of Y while going in the positive direction at which point X sin Theta equals Y and the sampled value will be Z sin theta or, substituting for sin theta, will be Z times Y divided by X.

10. The invention according to claim 9 wherein said means to sample and store comprise;

a. comparator means having said DC output as a first input and X sine ωt as a second input and arranged to supply a pulse output when the value of X sine ωt reaches equality with said DC value when going in a positive direction;

b. switching means having Z sin ωt as an input and responsive to said pulse to provide said input as an output at the occurrence of said pulse; and c. means to store the output of said switching means.

11. The invention according to claim 10 wherein said comparator comprises a differential amplifier having a capacitor in series with its output, said switching means comprises a transistor, said storage means comprises a capacitor and further including a unity gain amplifier interposed between said capacitor and the circuit output to avoid discharging said capacitor.

12. The invention according to claim 11 wherein each of said frequencies provided by said doppler system is provided as a first frequency output when the velocity is in a positive direction and as a second frequency output when the velocity is in a negative direction, and wherein each of said bucket counter clipper-multiplier units comprises at least a pair of clipper-multiplier bucket counters, one clipper-multiplier bucket counter having the frequency proportional to a positive velocity as an input and another clipper-multiplier bucket counter having the frequency proportional to the negative velocity as an input, said one clipper-multiplier bucket counter being arranged to provide current in a first direction and said other clipper-multiplier bucket counter being arranged to provide current in the opposite direction and wherein said voltage to frequency converter provides a first frequency output for a positive output from said amplifier and a second frequency output for a negative output from said amplifier; and said further clipper-multiplier bucket counter comprises a pair of clipper-multiplier bucket counters one having said first frequency output as an input and providing a feed back current in said second direction and the other having said second frequency output as an input and providing a feedback current in said first direction.

13. The invention according to claim 12 where each of said clipper-multiplier bucket counter units having as another input one of the said D.C. voltages proportional to said trigonometric functions comprises:

a. a first clipper-multiplier bucket counter having said first frequency output and said D.C. reference as inputs and providing an output current in a first direction which is proportional their product;

b. a second clipper-multiplier bucket counter having said first frequency output, said D.C. reference voltage and one of said proportional voltages as inputs and providing an output current in an opposite direction which is proportional to the difference between said D.C. reference voltage and said one proportional voltage time said first frequency;

c. a third clipper-multiplier bucket counter having said second frequency output and said D.C. reference as inputs and providing an output current in said opposite direction which is proportional to the product of said inputs;

d. a fourth clipper-multiplier bucket counter having said second frequency output, said D.C. reference voltage and said one proportional voltage as inputs and providing an output current in said first direction which is proportional to the difference between said D.C. reference voltage and said one proportional voltage times said second frequency.

14. The invention according to claim 1 wherein said heading velocity is expressed as: $V_H = V_x - V_z \cos R \sin P \; (-V_x \sin^2 P/1+\cos P) + V_y \sin R \sin P$ and said drift velocity as: $V_D = V_y + V_z \sin R - V_y (\sin^2 R/1+\cos R)$ and said circuit means to provide said DC voltages comprise:

a. a multiplying demodulator having sin R cos R and sin P as inputs and providing sin P cos R as an output;

b. a first sampling multiplier-divider having sin P, the reference AC voltage, and sin R as inputs and providing as an output sin R sin P;

c. a second sampling multiplier-divider having sin P, 1 + cos P and sin P as inputs and providing an output which is equal to $\sin^2 P$ over 1+ cos P;

d. A first phase sensitive demodulator having sin R as an input and providng a DC value proportional thereto as an output;

e. a third sampling multiplier-divider having sin R, 1+cos R and sin R as inputs and providing as an output $\sin^2 R$ divided by 1+ cos R; said means to develop a DC reference voltage comprises;

f. a second phase sensitive demodulator having the reference AC voltage as n input; and said plurality of clipper-multiplier and bucket counter units comprise:

g. a first clipper-multiplier and bucket counter unit having the frequency proportional to $V_x$ and said reference DC voltage as such inputs;

h. a second clipper-multiplier and bucket counter unit having the frequency proportional to $V_z$ and the output of said multiplying demodulator as inputs;

i. a third clipper-multiplier and bucket counter unit having the frequency proportional to $V_x$ and the output of said second sampling multiplier-divider as inputs;

j. a fourth clipper-multiplier bucket counter unit having the frequency proportional to $V_y$ and the output of said first sampling multiplier-divider as inputs;

k. a fifth clipper-multiplier and bucket counter unit having the frequency proportional to $V_y$ and said DC reference voltage as inputs;

l. a sixth clipper-multiplier and bucket counter unit having the frequency proportional to $V_z$ and the output of said first phase sensitive demodulator as inputs;

m. a seventh clipper-multiplier and bucket counter unit having the frequency proportional to $V_Y$ and the output of said third sampling multiplier-divider as inputs;

n. the outputs of said first, second, third and fourth clipper-multiplier and bucket counter units being summed in said first summing means; and o. the outputs of said fifth, sixth and seventh clipper-multipliers and bucket counter units being summed in said second summing means.

15. The invention according to claim 14 wherein said first and second summing means comprises first and second operational amplifiers and further including for each of said first and second amplifiers:

a. a voltage to frequency converter having as an input the amplifier output;

b. a further clipper-multiplier and bucket counter unit having the output of said converter as one input and said DC reference voltage as another input and providing its output as a further input to be summed by said amplifier whereby closed loop operation will result.

16. The invention according to claim 15 wherein said multiplying demodulator comprises:

a. a 90° phase shifter having as an input sine R;

b. means to sum the output of said phase shifter with cosine R;

c. a phase sensitive demodulator having sine P as a signal input and the output of said summing means as a switching input and providing as a D.C. output the value of its signal input averaged over the period during which said switching input is present.

17. The invention according to claim 16 wherein said summing means comprises an operational amplifier.

18. The invention according to claim 15 where the inputs of each of said sampling multiplier-dividers may be considered respectively as X, Y and Z, the instantaneous values of said quantities being respectively $X \sin \omega t$, $Y \sin t$ and $Z \sin \omega t$, and wherein each of said sampling multiplier-divider comprises:

a. a phase sensitive demodulator having $Y \sin \omega t$ as an input and providing a D.C. value of Y proportional to the RMS value of said input as an output; and b. means having said D.C. output and $X \sin \omega t$ as inputs and adapted to sample and store the instantaneous value of $Z \sin \omega t$ at the point where $\sin \omega t$ equals theta which occurs when the instantaneous value of $X \sin \omega t$ becomes equal to the D.C. value of Y while going in the positive direction at which point X sin Theta equals Y and the sample value will be Z sin theta or, substituting for sin theta, will be Z times Y divided by X.

19. The invention according to claim 18 wherein said means to sample and store comprise;

a. comparator means having said D.C. output as a first input and X sine $\omega t$ as a second input and arranged to supply a pulse output when the value of $X \sin \omega t$ reaches equality with said D.C. value when going in a positive direction;

b. switching means having Z sine $\omega t$ as an input and responsive to said pulse to provide said input as an output at the occurrence of said pulse; and c. means to store the output of said switching means.

20. The invention according to claim 19 wherein said comparator comprises a differential amplifier having a capacitor in series its output, said switching means comprises a transistor, said storage means comprises a capacitor and further including a unity gain amplifier interposed between said capacitor and the circuit output to avoid discharging said capacitor.

21. The invention according to claim 20 whereieach of said frequencies provided by said doppler system is provided as a first frequency output when the velocity is in a positive direction and as a second frequency output when the velocity is in a negative direction, and wherein each of said bucket counter clipper-multiplier units comprises at least a pair of clipper-multiplier bucket counters, one clipper-multiplier bucket counter having the frequency proportional to a positive velocity as an input and another clipper-multiplier bucket counter having the frequency proportional to the negative velocity as an input, said one clipper-multiplier bucket counter being arranged to provide current in a first direction and said other clipper-multiplier bucket counter being arranged to provide current in the opposite direction and wherein said voltage to frequency converter provides a first frequency output for a positive output from said amplifier and a second frequency output for a negative output from said amplifier and said further clipper-multiplier bucket counter comprise a pair of clipper-multiplier bucket counters, one having said first frequency output as an input and providing a feed back current in said second direction and the other having said second frequency output as an input and providing a feed back current in said first direction.

22. The invention according to claim 21 wherein each of said clipper-multiplier bucket counter units having as another input one of said D.C. voltages proportional to said trigonometric functions comprises:

a. a first clipper-multiplier bucket counter having said first frequency output and said D.C. reference as inputs and providing an output current in a first direction which is proportional their product;

b. a second clipper-multiplier bucket counter having said first frequency output, said D.C. reference voltage and one of said proportional voltages as inputs and providing an output current in an opposite direction which is proportional to the difference between said D.C. reference voltage and said one proportional voltage time said first frequency;

c. a third clipper-multiplier bucket counter having said second frequency output and said D.C. reference as inputs and providing an output current in said opposite direction which is proportional to the product of said inputs;

d. a fourth clipper-multiplier bucket counter having said second frequency output, said D.C. reference voltage and said one proportional voltage as inputs and providing an output current in said first direction which is proportional to the difference between said D.C. reference voltage and said one proportional voltage times said second frequency.

* * * * *